Oct. 5, 1937.   S. BROWN   2,094,835

TRAP

Filed Aug. 8, 1935

Inventor;
Stewart Brown,
by Charles J. Hervey
his Atty.

Patented Oct. 5, 1937

2,094,835

UNITED STATES PATENT OFFICE 2,094,835

TRAP

Stewart Brown, Chicago, Ill.

Application August 8, 1935, Serial No. 35,331

6 Claims. (Cl. 43—82)

This invention relates to traps, and in its present form has been designed more particularly for use as a mouse trap. However, by increasing its size, it may be used for trapping larger animals.

One of the objects of the present invention is to provide a baited trap, that is, a trap which is sold to the public with the bait incorporated therewith.

Another object is to provide a trap wherein the usual trigger, which springs the trap, is located in advance of the bait, whereby the trap is sprung before the animal reaches the bait.

Another object is to provide a bait cartridge, charged with bait, which is protected against the effects of the elements by a suitable protective medium.

Another object is to provide a grille or other guard over the bait contained in the cartridge whereby the bait is not accessible to the animal, but its presence may be readily detected from its odor.

Another object is to simplify and otherwise improve upon traps of this character.

Other objects and advantages will appear in the course of this specification, and with such objects and advantages in view, this invention consists in the several novel features hereinafter fully set forth and claimed.

The invention is clearly illustrated in the drawing accompanying this specification, in which:—

Figure 1:
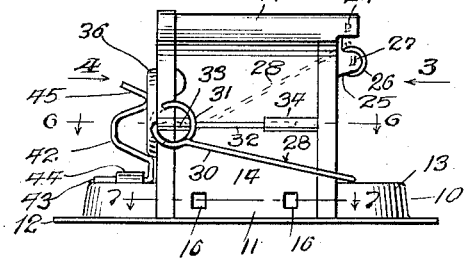
Fig. 1 is a side elevation of a trap embodying one form of the present invention.

Referring to said drawing, first to Figs 1 to 8, inclusive, the reference character 10 designates a base from which rises a housing 11, secured thereto in any desirable manner. As a preference, the base and housing are formed of tin or other light sheet metal struck up by suitable dies to form the shapes illustrated.

The base 10 has a rim or flange 12 at its bottom and the main portion of the metal is drawn upward to form a raised portion 13. The housing is of substantially inverted U-shape, with its side walls 14 projecting down along the sides of the raised part of the base and fastened thereto by tongues 15, which are struck up from the side walls of the housing, passed through apertures 16 in the side walls of the base and then clenched against the side walls of the base.

The housing is open-ended and its upper side is drawn upward to provide an inverted U-shaped hollow rib 17 running along the top of the housing to provide a bearing for the trigger 18. Desirably, the trigger is formed of a piece of tin bent up into a U-shape, to the bottom 19 of which is rigidly secured a trigger arm 20, the free end of which is formed into a rather wide coil 21, which is clearly illustrated in Fig. 3. The trigger ordinarily extends in an inclined direction from back to front across the cavity in the housing so as to bar the way to the bait 22. The trigger is formed with a pair of ears 23, which are fulcrumed upon a pin 24 extending crosswise of the rib 17 and secured in the ends thereof. The trigger is also formed with a pair of ears 25, between which is rotatably mounted a small roller 26. A pin 27 extending through the ears 25 and the roller 26 provides the bearing for the roller.

A spring actuated bail 28 is provided for trapping the animal. Said bail has a crosswise extending part 29 which extends across the open front of the housing and it has two arms 30 that extend back toward the rear end of the housing where both of them are coiled to form coiled springs 31, the ends 32 of which are secured to the side walls of the housing.

Desirably, the side walls of the housing are struck up, outwardly, to provide sockets 33, 34, between which the side walls are struck up, inwardly, to provide companion sockets 35, into which the arms 32 of the spring bail 28 are inserted for connecting the spring bail to the housing. It is to be observed that the outwardly struck up sockets 33 extend diametrically across the inner end coils of the springs, thereby preventing accidental disengagement between the spring bail and the housing.

To set the trap, the bail is raised from the position seen in solid lines in Fig. 1, to the position seen in dotted lines therein, with the cross member 29 of the bail engaging the upper side of the roller 26 at a point slightly past a line extending through the axes of the pins 24, 27. Whenever the free end of the trigger is lifted ever so slightly, the cross member of the bail moves over the center of the roller, and the coil springs instantly swing it down upon the raised part of the base 10.

The bait 22 may comprise cheese or other suitable bait material and desirably is contained in a cup-like cartridge 36 which is dished downward to provide a receptacle for the bait and flanged outwardly to provide a rim 37. In order to preserve the bait before the trap is put into use, a paper or other disc 38 (see Fig. 8) is placed upon the exposed surface of the bait and paraffin or other suitable covering material 39 is applied over the outer surface of the disc and the flange 37, thereby hermetically sealing the bait in the cartridge.

Figure 2:
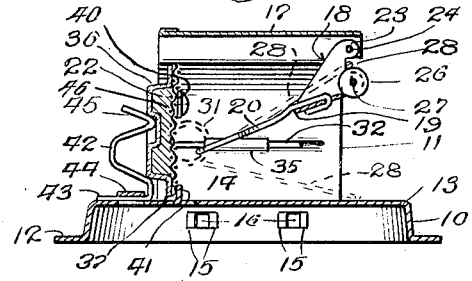
Fig. 2 is a central, vertical, longitudinal section thereof, taken on the line 2—2 of Fig. 5.
Figure 3:
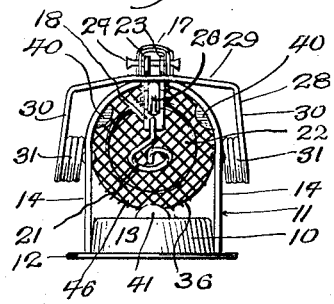
Fig. 3 is a front elevation looking in the direction of the arrow in Fig. 1.
Figure 4:
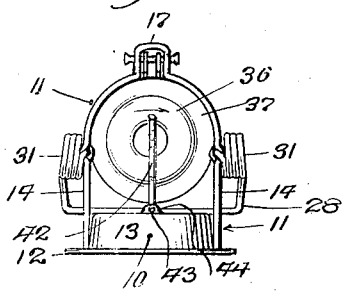
Fig. 4 is a rear elevation looking in the direction of the arrow 4 in Fig. 1.
Figures 5, 8:
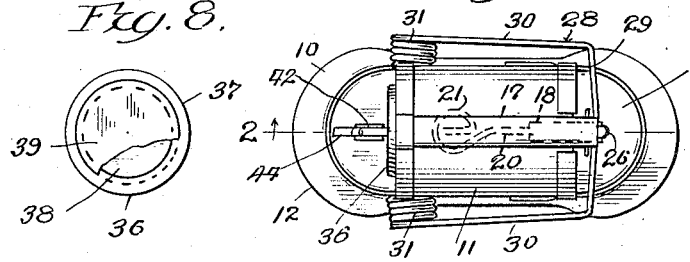
Fig. 5 is a plan of the trap.
Fig. 8 is a plan of the bait cartridge, showing part of the protective material broken away.
Figure 6:
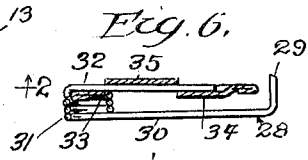
Fig. 6 is a detail, horizontal section, taken on the line 6—6 of Fig. 1.
Figure 7:
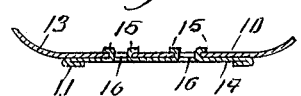
Fig. 7 is a detail, horizontal section, taken on the line 7—7 of Fig. 1.

The bait cartridge, with its protected covering, is placed in the rear end of the housing and is held therein by a number of tongues 40, 41, struck up from the side walls of the housing and the top wall of the base, and extending radially into the interior of the housing. A spring latch 42, desirably formed of a piece of wire bent up into the form shown in Figs. 1 and 2, is employed for holding the cartridge against the tongues 40, 41. The latch 42 has an arm 43 which extends through a loop 44 which is struck up from the top of the base 10, thereby forming a fulcrum whereby the latch may be swung laterally beyond the edge of the cartridge to permit the latter to be inserted into the housing or moved therefrom. The free end 45 of the latch is shown as of a V-shape and enters a slight depression formed in the cartridge shell. Desirably a grille 46, formed of wire mesh or the like is interposed between the cartridge and tongues 40, 41 and prevents access to the bait contained in the cartridge.

The trap is sold with the protected bait held in the housing by the latch 42, thus providing a baited trap as a unitary article.

To use the same, the latch is swung to one side, the bait cartridge removed, the paraffin 39 and disc 38 removed and the filled cartridge replaced and secured in place by the latch. To set the trap, the spring bail is swung upward into engagement with the roller of the trigger, as has been explained.

A mouse or other animal attempting to reach the bait, encounters the underside of the trigger arm 20 before it reaches the bait, thereby raising the trigger and springing the trap.

Figure 9:
Fig. 9 is a side elevation, partly broken out, showing a slightly modified form of the invention.

In Fig. 9, I have illustrated a conventional mouse trap, provided with a bait cartridge.

Briefly, the mouse trap shown in Fig. 9 comprises a base 10$^a$, a spring bail 28$^a$, and a trigger 18$^a$. The trigger is formed with a loop 18$^b$ on its free end, in which may be held a loaded cartridge 36$^a$ over which is secured a grille 46$^a$. Instead of placing the loaded cartridge on the trigger, the cartridge 36$^b$ may be placed in a hole 10$^b$ formed in the base. Desirably a spring clip 46$^b$, which extends across the grille and engages with the underside of the rim of the cartridge, is provided to hold the grille in place thereon.

From the above it is apparent that the conventional mouse trap may be equipped with a bait cartridge and sold in that condition to the public, and all that is required to do is to remove the protective covering from the cartridge and replace the cartridge on the trap.

Further it is to be observed that the trigger in both of the forms illustrated, guards the bait so that the animal must spring the trap before it can reach the bait. This permits the bait to be used over again instead of having to rebait the trap each time it is sprung.

Although the trap is furnished with a bait cartridge, other cartridges may be supplied as an accessory to the trap.

More or less variation of the exact details of construction is possible without departing from the spirit of this invention. I desire, therefore, not to limit myself to the exact form of the construction shown and described, but intend, in the following claims to point out all of the invention disclosed herein.

I claim as new and desire to secure by Letters Patent:

1. A trap comprising a base, a housing rising therefrom, a trigger in the housing and a spring bail co-operating therewith, a bait cartridge removably contained in the housing beyond the trigger and a latch engaging the cartridge to hold the same in the housing.

2. A trap comprising a base, a housing, a trigger therein, and a spring bail mounted on the housing and co-operating with the trigger, inwardly projecting tongues struck up from the housing at a place beyond the trigger, a latch and a bait cartridge held between said tongues and latch.

3. In a trap, a housing having inwardly and outwardly struck up loops, and a spring bail having arms extending through said loops, said bail having coiled springs which are engaged by certain of said outwardly struck up loops.

4. In a trap, the combination of a bail supporting element, a trigger controlled, spring actuated bail mounted thereon, and there being a hole in the bail supporting element located beyond the trigger, and a bait cartridge having hermetically sealed bait therein removably held in and closing said hole.

5. A trap, comprising a base, a housing, open at both ends, rising therefrom, a spring bail mounted on the housing, a trigger arranged to releasably hold the spring bail in set position, and a bait cartridge removably held in an open end of the housing and substantially closing said end.

6. A trap, comprising a base, a housing, open at both ends, rising therefrom, a baited bait cartridge removably held in one open end of the housing and substantially closing said end, a trigger in said housing disposed between said bait cartridge and the open end of the housing, and a spring bail having a cross member adapted to be swung across said open end of the housing, said trigger having means engaging said bail to hold it in set position.

STEWART BROWN.